(12) United States Patent
Yamauchi

(10) Patent No.: US 7,428,081 B2
(45) Date of Patent: Sep. 23, 2008

(54) IMAGE READING APPARATUS

(75) Inventor: Tsuyoshi Yamauchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 10/360,080

(22) Filed: Feb. 7, 2003

(65) Prior Publication Data

US 2003/0147105 A1 Aug. 7, 2003

(30) Foreign Application Priority Data

Feb. 7, 2002 (JP) ............... 2002-030919

(51) Int. Cl.
H04N 1/04 (2006.01)
(52) U.S. Cl. ............. 358/474; 358/497; 358/496; 347/19.5; 250/208.1
(58) Field of Classification Search ............. 358/474, 358/487, 501, 505, 497, 496, 1.15; 347/19, 347/50; 250/208.1
See application file for complete search history.

(56) References Cited

U.S. PATENT DOCUMENTS

| 4,575,227 | A | * | 3/1986 | Ito et al. ............ 355/56 |
| 5,038,028 | A | * | 8/1991 | Boyd et al. ............ 250/208.1 |
| 5,596,360 | A | * | 1/1997 | Ichinose ............ 347/256 |
| 5,757,403 | A | * | 5/1998 | Nagashima ............ 347/50 |
| 6,039,427 | A | * | 3/2000 | Kanome ............ 347/19 |
| 6,339,214 | B1 | * | 1/2002 | Takakura et al. ......... 250/208.1 |
| 7,006,260 | B2 | * | 2/2006 | Sato et al. ............ 358/448 |
| 7,315,040 | B2 | * | 1/2008 | Auer et al. ............ 250/589 |

2001/0040705 A1 11/2001 Yokota

FOREIGN PATENT DOCUMENTS

| CN | 1318938 | 10/2001 |
| JP | 63-302666 | 12/1988 |
| JP | 02-101868 | 4/1990 |
| JP | 02-101968 | 4/1990 |
| JP | 02-085427 | 7/1990 |
| JP | 05-219315 | 8/1993 |
| JP | 08127470 A * | 5/1996 |
| JP | 2001-76547 | 3/2001 |
| JP | 01-346006 | 12/2001 |
| JP | 2001-346006 | 12/2001 |

OTHER PUBLICATIONS

Japenese Office Action of Japanese Application No. 2002-030919, dated Jun. 29, 2007. Translation not available.

* cited by examiner

Primary Examiner—Edward L. Coles
Assistant Examiner—Negussie Worku
(74) Attorney, Agent, or Firm—Morgan & Finnegan LLP

(57) ABSTRACT

This invention has as its object to prevent a flexible flat cable which connects a control board and an image reading unit from contacting a document table glass. An image reading apparatus has an image reading unit for reading a document placed on a document table glass, a drive unit for scanning the image reading unit relative to the document, and a flexible flat cable for electrically connecting an electric circuit fixed in the main body of the image reading apparatus, and the image reading unit which moves relative to the main body. That portion of the flexible flat cable, which includes a portion that is movable upon scanning of the image reading unit is folded into at least two, and stands nearly perpendicularly to the document table glass.

3 Claims, 8 Drawing Sheets

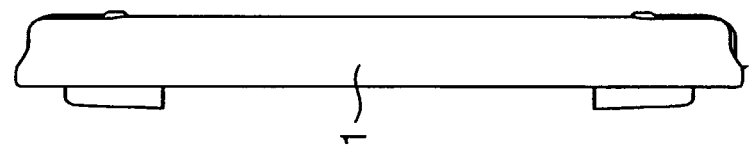
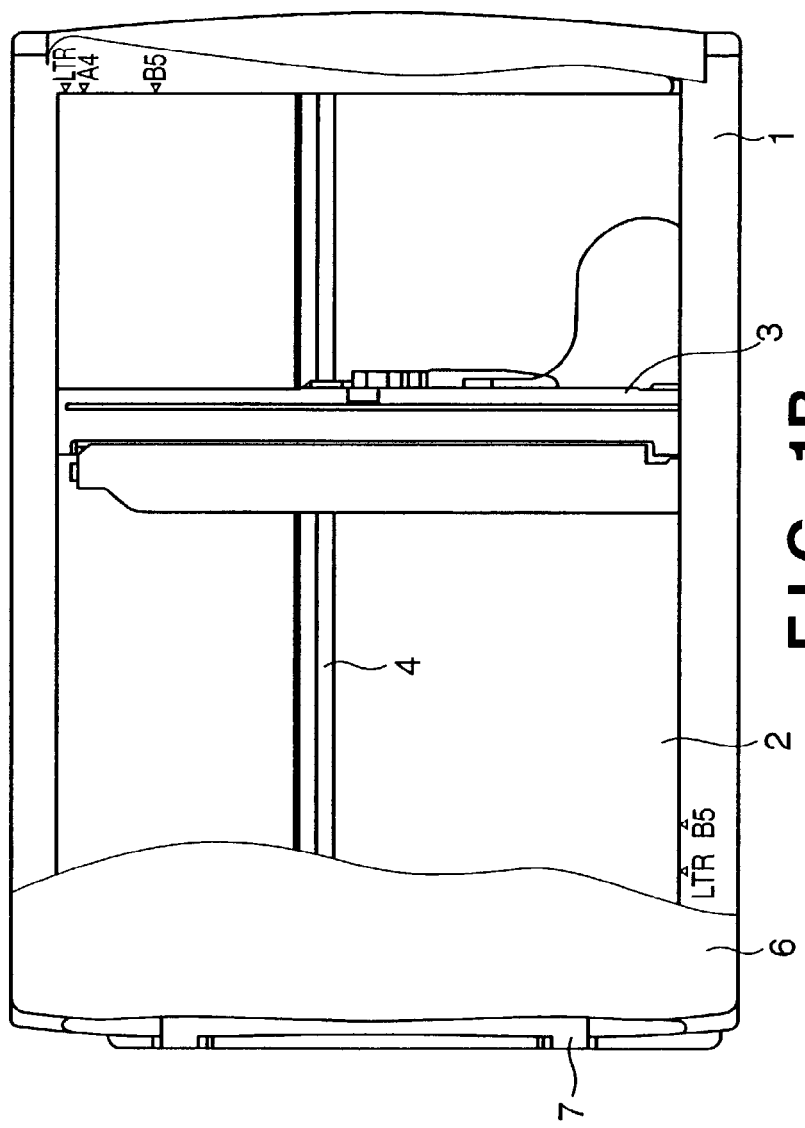
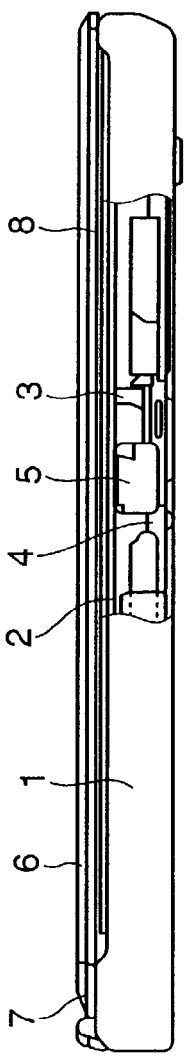

FIG. 6
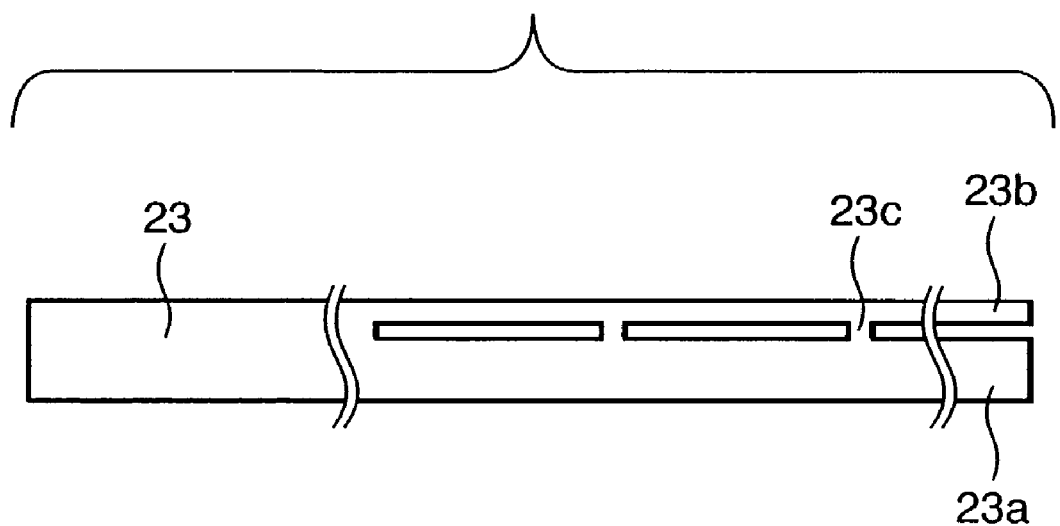
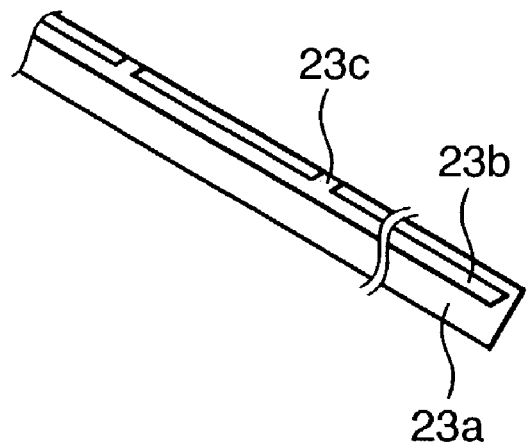

IMAGE READING APPARATUS

FIELD OF THE INVENTION

The present invention relates to an image reading apparatus for reading and outputting a document such as a photo, text, and the like.

BACKGROUND OF THE INVENTION

In recent years, image reading apparatuses such as scanners and the like have been prevalently used along with the popularization of personal computers. Of such image reading apparatuses, flatbed type image reading apparatuses are downsized year by year in terms of their installation and storage spaces.

FIG. 8 is a schematic explanatory view showing the structure of a conventional flatbed image reading apparatus. An image reading apparatus in FIG. 8 optically reads document information by placing a document facing down on a document table glass 51 as the upper surface of an apparatus main body 50, and scanning a contact image sensor 52 as an image reading device provided in the apparatus main body 50. In this image reading apparatus, an FFC (flexible flat cable) 53 that electrically connects a control board 54 placed in the apparatus main body and a document reading unit that reads a document image is arranged nearly parallel to the document table glass.

In the conventional flatbed image reading apparatus, when the entire apparatus is rendered compact and the space in the apparatus is small, i.e., when the apparatus has a low-profile structure, the FFC 53 may contact glass depending on the sub-scan position of the image reading device. As a result, the FFC 53 may stain the glass, or may be folded or entwine due to the contact resistance, thus deteriorating a read image, and causing operation errors.

SUMMARY OF THE INVENTION

Therefore, the present invention has been made in consideration of the above situation, and has as its object to prevent a flexible flat cable that connects a control board and image reading unit from contacting a document table glass.

In order to solve the aforementioned problem and to achieve the above object, according to the first aspect of the present invention, an image reading apparatus is characterized by comprising an image reading device for reading a document placed on a document table, a drive device for scanning the image reading device relative to the document, and a connection device for connecting a signal processing unit fixed in a main body of the image reading apparatus, and the image reading device which moves relative to the main body, and in that a portion of the connection device, which includes a portion that is movable upon scanning of the image reading device, is folded into at least two in a widthwise direction thereof, and stands substantially perpendicularly to the document table.

According to the second aspect of the present invention, an image reading apparatus is characterized by comprising an image reading device for reading a document placed on a document table, a drive device for scanning the image reading device relative to the document, and a band-shaped connection device for connecting a signal processing unit which processes a signal output from the image reading device, and the image reading device which moves relative to the signal processing unit by the drive device, and in that the connection device is connected to a portion of a side surface in a longitudinal direction of the image reading device, and is connected to the signal processing unit to wrap around the longitudinal direction of the image reading device.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 1A to 1C are views showing the arrangement of an image reading apparatus according to the first embodiment;

FIG. 6 is a view showing an FFC arrangement according to the second embodiment;

DETAILED DESCRIPTION OF THE PREFERRED EMBODIMENTS

Preferred embodiments of the present invention will be described in detail hereinafter with reference to the accompanying drawings.

Note that the scope of the invention is not limited to the dimensions, materials, shapes, relative positions, and the like of the building components described in this embodiment, unless otherwise specified.

First Embodiment

The first embodiment will be described below with reference to FIGS. 1A to 5.

(Overall Arrangement)

At first, an overall arrangement of an image reading apparatus will be described with reference to FIGS. 1A to 3.

Figure 2:
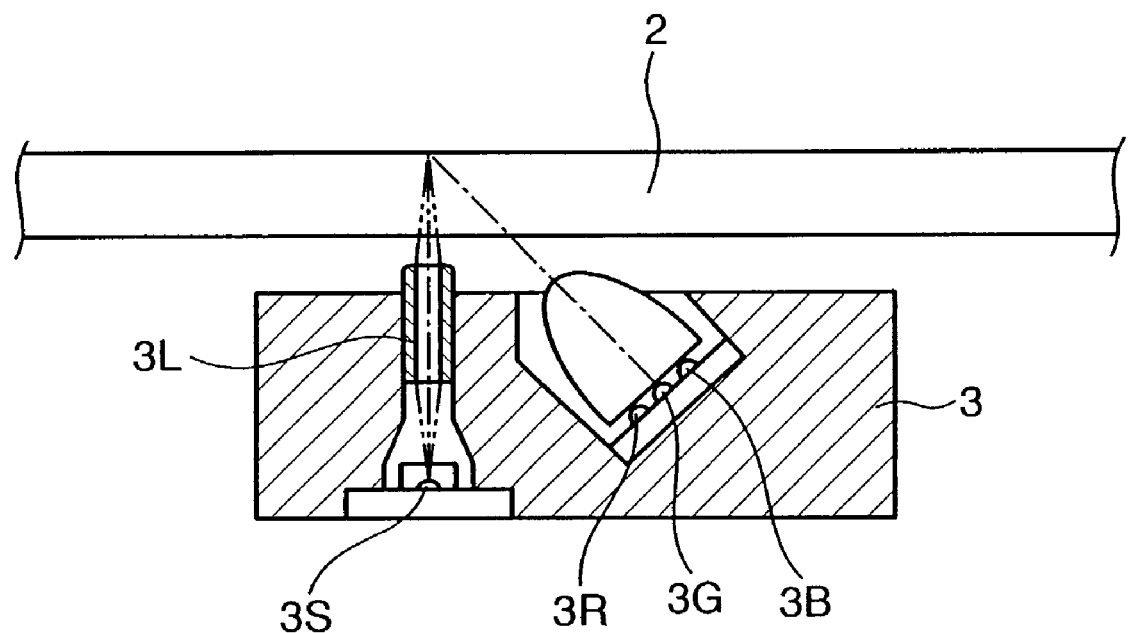
FIG. 2 is a schematic sectional view showing the arrangement of a contact sensor according to the first embodiment.

FIGS. 1A to 1C show the arrangement of an image reading apparatus according to this embodiment. FIG. 1A is a partially cutaway plan view, FIG. 1B is a partially cutaway front view, and FIG. 1C is a side explanatory view. FIG. 2 is a schematic sectional view showing the arrangement of a contact image sensor.

As shown in FIGS. 1A to 1C, a document image is read by setting a document on a document table glass 2 attached to the upper surface of an apparatus main body 1, and scanning a contact image sensor 3 as an image reading device in the apparatus main body 1 parallel to the document table glass 2.

As shown in FIG. 2, the contact image sensor 3 incorporates three-color LEDs 3R, 3G, and 3B as light sources for document illumination, a rod lens array 3L for forming an optical image of light reflected by a document on a light-receiving element of an image sensor 3S, and the image sensor 3S. The contact image sensor 3 turns on the three-color LEDs 3R, 3G, and 3B while switching them in turn, and the image sensor reads light reflected by a document for each color, thus reading color-separated images.

As shown in FIGS. 1A and 1B, the contact image sensor 3 is fixed on and supported by a slider 5, which slides along a guide shaft 4 fixed to the apparatus main body 1. Also, a motor serving as a scan drive source is fixed to the slider 5. By rotating the motor in the forward and reverse directions, the contact image sensor 3 can reciprocally scan the range of the document table glass 2.

The building components of the image reading apparatus include electrical components such as a control board and power supply, in addition to the above components. These building components are arranged in the apparatus main body 1 that fixes and supports the document table glass 2.

A document cover 6 serving as a document pressing member that presses a document against the surface of the document table glass 2 is attached to the apparatus main body 1 to be free to open/close the document table glass 2.

A document contact pressing sheet 8 formed of a sheet member and sponge is adhered to the inner surface that faces the document table glass 2 of the document cover 6.

Figure 3:
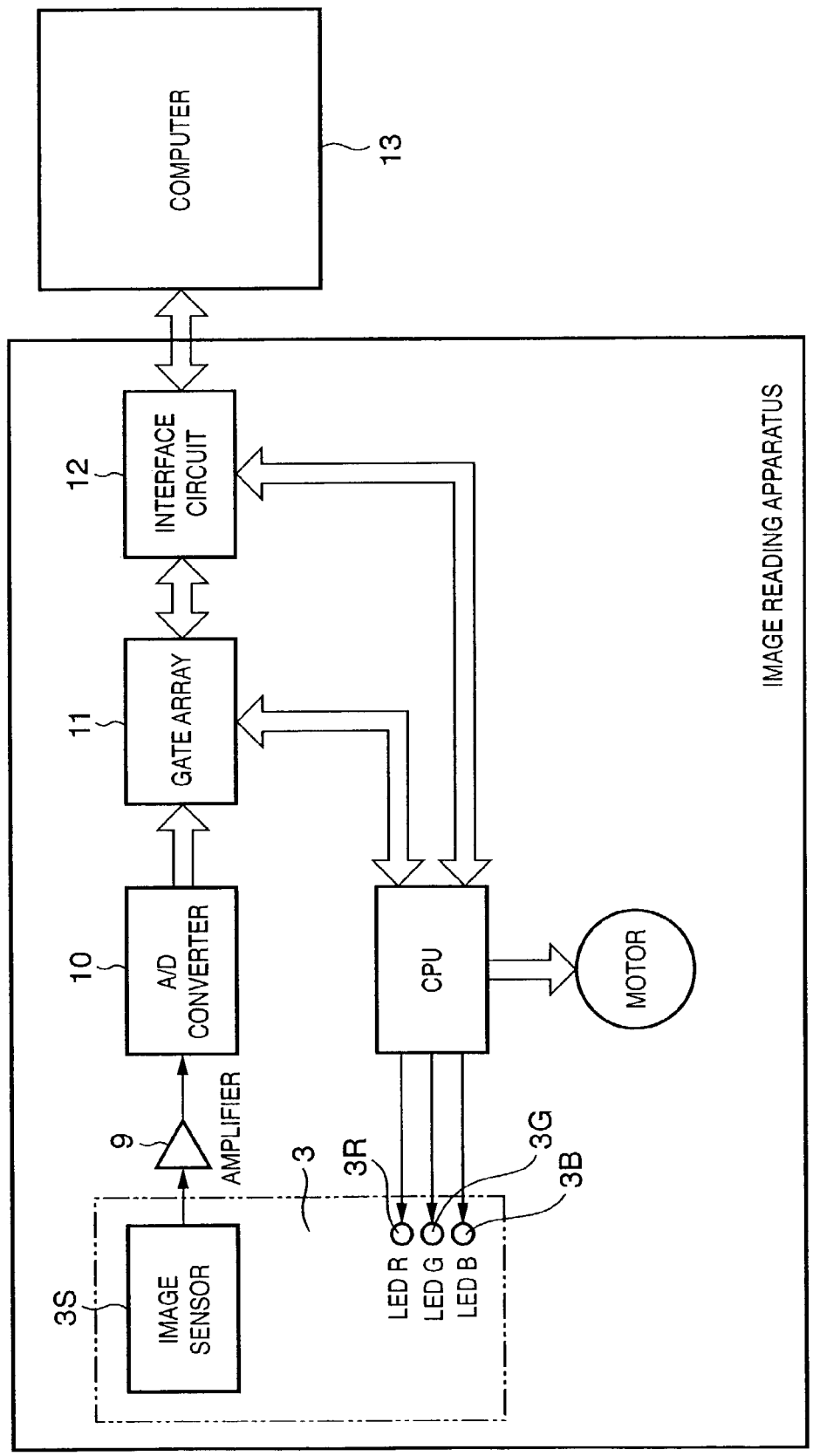
FIG. 3 is a block diagram of a read image data process in the image reading apparatus according to the first embodiment.

A read image data process in the image reading apparatus will be described below. FIG. 3 is a block diagram of a read image data process in the image reading apparatus.

Image output signals, which are read by the image sensor 3S in synchronism with the LEDs 3R, 3G, and 3B that are turned on/off in turn, are sent to and amplified by an amplifier 9, and the amplified signals are converted into digital image signals by an A/D converter 10.

The A/D converter 10 divides the dynamic range (the read output difference between true white and black portions on a document) of the image sensor 3S in correspondence with its number of bits, and assigns gray levels in accordance with the luminance levels of an image on the document.

For example, when the A/D converter 10 with an 8-bit resolution is used, the range between white and black can be identified by 256 gray levels. On the other hand, in case of a 10-bit A/D converter, that range can be identified by 1024 gray levels.

Therefore, an image reading apparatus using an 8-bit A/D converter can identify 24 bits=around 16.7 million colors, and an image reading apparatus using a 10-bit A/D converter can identify 30 bits=around 1.074 billion colors, in case of color reading using three, i.e., R, G, and B light sources.

The image reading apparatus has several output formats of an image signal, and can select an output format suitable for the purpose of a read image. When text is read and its contents are input to an OCR, or when a monochrome line image is read, a monochrome binary image is suitable, and image data obtained by binarizing an image signal, which is obtained by turning on only the G light source of the R, G, and B light sources, using a given threshold value by an image processing circuit built in a gate array 11 is used.

When an image is read for the purpose of outputting an image such as a photo or the like to a monochrome printer, image data binarized by a halftone process such as dithering, error diffusion, or the like also using an image signal by turning on only the G light source is used. When a color image is processed, multi-valued (24 bits, etc.) image data is suitable.

The image signal output from the image processing circuit is output to an apparatus such as a personal computer 13 or the like via an interface circuit 12.

(Arrangement of FFC (Flexible Flat Cable))

The arrangement of an FFC as a connection device according to the first embodiment of the present invention will be described below.

Figure 4:
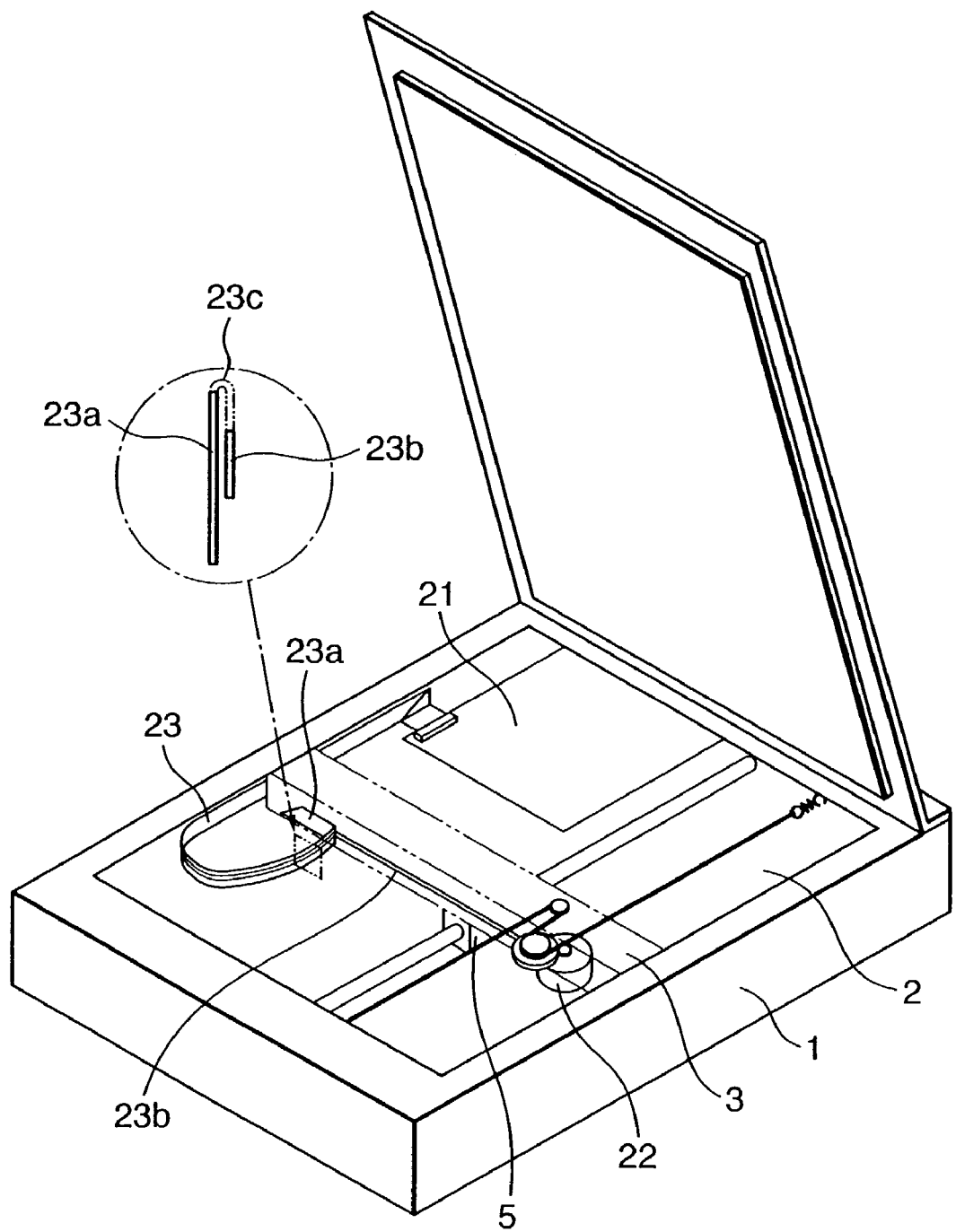
FIG. 4 is a perspective view showing an FFC arrangement according to the first embodiment.

As shown in FIG. 4, an FFC 23 is arranged in the apparatus to send a signal from a control board 21 placed in the apparatus main body 1 to the contact image sensor 3 and a motor 33 arranged in the slider 5. One end of the FFC 23 is connected to the control board 21 as a signal processing device, and its other end is connected to the contact image sensor 3 and motor 22 to wrap around the contact image sensor 3 from its longitudinal direction. The FFC 23 consists of 12 signal lines 23a for the contact sensor, 4 signal lines 23b for the motor, i.e., a total of 16 signal lines.

Since this embodiment uses the FFC with a line spacing=1 mm, the FFC has a band shape having a width of 17 mm. In the aforementioned prior art, the FFC is used nearly parallel to the document table glass. However, in such arrangement, since the FFC contacts glass to stain glass or to cause a jam and operation errors, this embodiment uses an FFC standing upright in a direction perpendicular to the document table glass, i.e., in nearly the vertical direction in association with a movable portion. With this arrangement, since the FFC 23 can be prevented from contacting the glass 2, the aforementioned problem can be solved greatly.

However, it is impossible to simply set a 17-mm wide FFC upright in the image reading apparatus which is compact and has a limited space in its thickness direction. For this reason, several dummy lines 23c serving as a folding margin are arranged between the aforementioned 12 signal lines and 4 signal lines, and a movable portion upon scanning is vertically folded into two at the dummy lines 23c, thus reducing the total width (the height).

Figure 5:
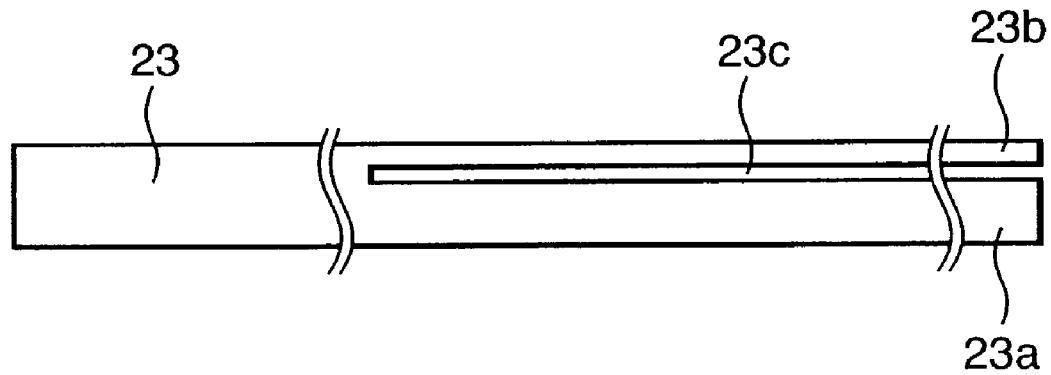
FIG. 5 is a view showing an FFC arrangement according to the first embodiment.

The dummy lines include no lead wires or are not used as signal lines. At this time, when the FFC is simply folded into two, the folded portion cannot smoothly move upon scanning the contact image sensor 3. To avoid this, in this embodiment, a slit is formed in some of the dummy lines 23c of the FFC, as shown in FIG. 5, and the FFC is divided into an FFC including 12 lines, and that including 4 lines, thus removing the resistance of the folded portion, and realizing smooth movement upon scanning.

Second Embodiment

In the above embodiment, the FFC is partially bifurcated into two FFC parts, i.e., an FFC including 12 lines, and that including 4 lines. In place of completely bifurcating the FFC into two parts, relatively long slits which do not suffer any resistance of the folded portion upon scanning may be formed via several-mm wide portions, as shown in FIG. 6, so as to obtain the same effect. With this arrangement, when one of the divided FFCs has a smaller number of pins and is narrower than those of the other like in this embodiment, it is effective to maintain the rigidity of the narrower FFC. Also, occurrence of any jam, operation errors, and the like due to interference of the divided FFCs can be avoided, thus realizing more stable image reading.

Third Embodiment

Figure 7:
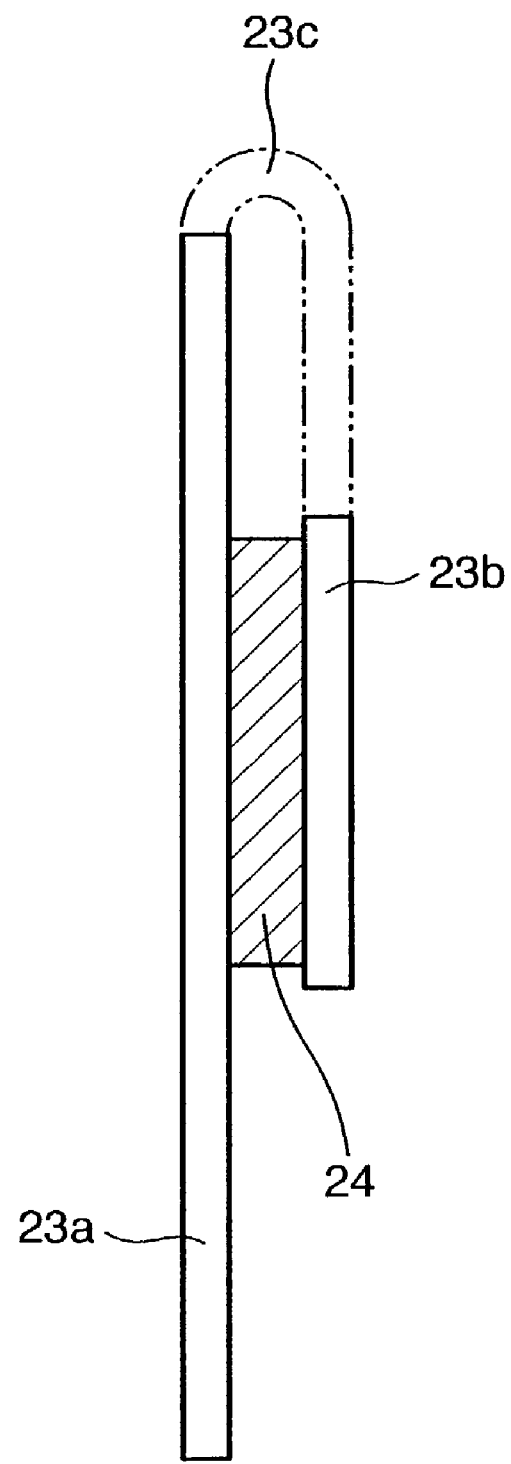
FIG. 7 is a view showing an FFC arrangement according to the third embodiment.
Figure 8:
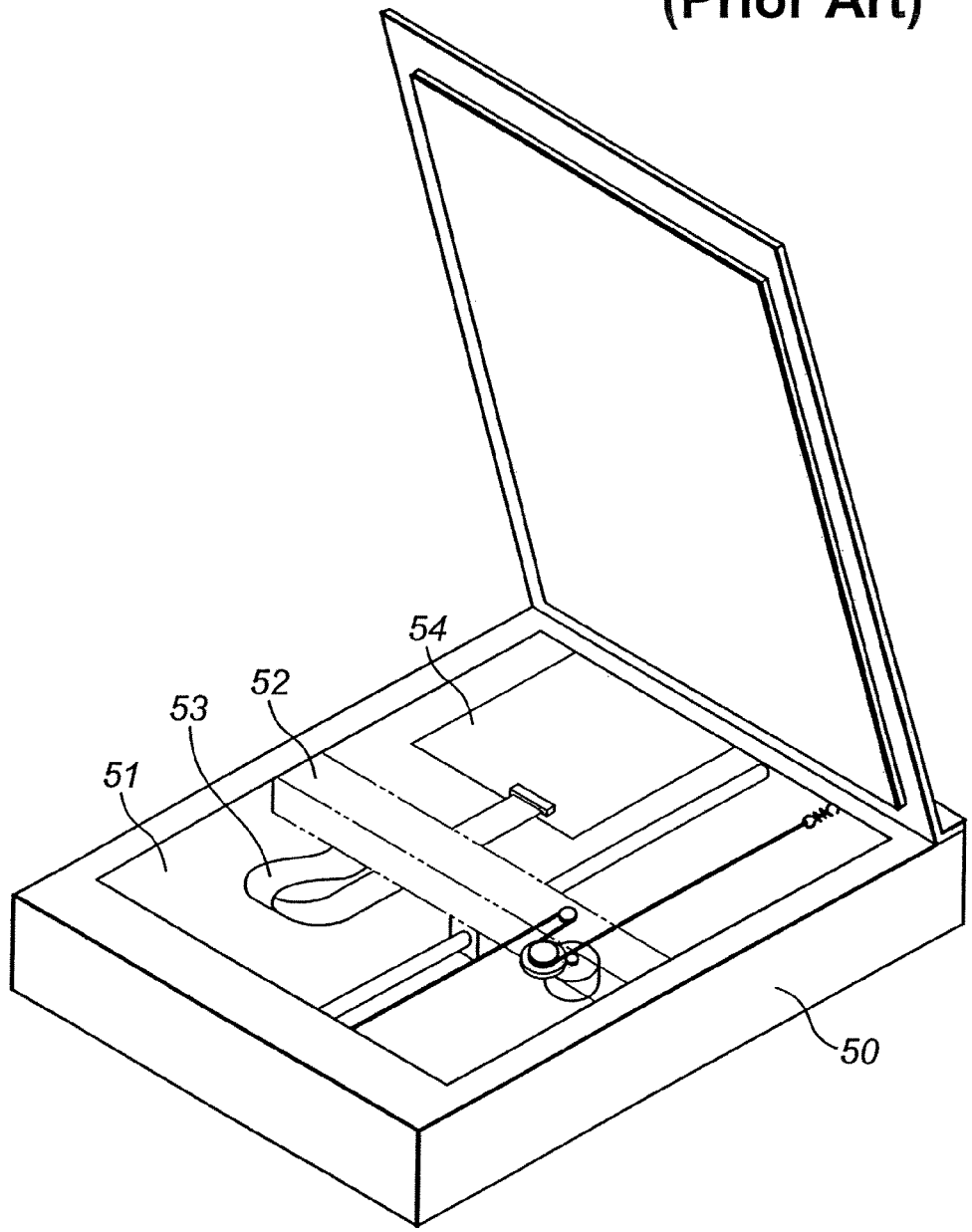
FIG. 8 is a schematic perspective view showing a conventional image reading apparatus.

In the second embodiment, some portions of the FFC are joined using the FFC itself. Alternatively, as shown in FIG. 7, movable portions of the divided FFCs may be partially fixed using a tape 24 such as a double-stick tape or the like, thus obtaining the same effect.

In the above embodiments, the 17-mm wide (12+4 lines) FFC is folded into two. However, the present invention is not limited to this, and the same effect can be obtained for a width other than 17 mm and an FFC which is folded in three or more.

As described above, according to the above embodiments, an FFC can operate stably with a simple, low-cost arrangement. For this reason, any image errors due to stain on glass can be avoided, and any image errors and operation errors can be avoided since a jam can be prevented, thus realizing stable, clear image reading.

To restate, according to the above embodiments, a flexible flat cable which connects a control board and an image reading unit can be prevented from contacting a document table glass.

The present invention is not limited to the above embodiments and various changes and modifications can be made within the spirit and scope of the present invention. Therefore, to apprise the public of the scope of the present invention the following claims are made.

What is claimed is:

1. An image reading apparatus comprising:
   an image reading device adapted to read a document placed on a document table;
   a drive device adapted to drive said image reading device relative to the document table; and
   a connection device adapted to connect a signal processing unit fixed in a main body of said image reading apparatus, and said image reading device which moves relative to the main body,
   wherein said connection device has a slit which extends in a longitudinal direction of said connection device and said connection device is folded at an extension line of the slit, and portions of the connection device that are movable upon scanning of said image reading device are separated by the slit and stands substantially perpendicularly to the document table.

2. The apparatus according to claim 1, wherein portions separated by the slit are partially joined.

3. The apparatus according to claim 1, wherein said connection device is connected to a portion of a side surface in a longitudinal direction of said image reading device, and is connected to the signal processing unit to wrap around the longitudinal direction of said image reading device.

* * * * *